Feb. 18, 1936.　　　L. E. GILSON　　　2,031,157
SHADE FOR GREENHOUSES
Filed March 4, 1935　　2 Sheets-Sheet 1
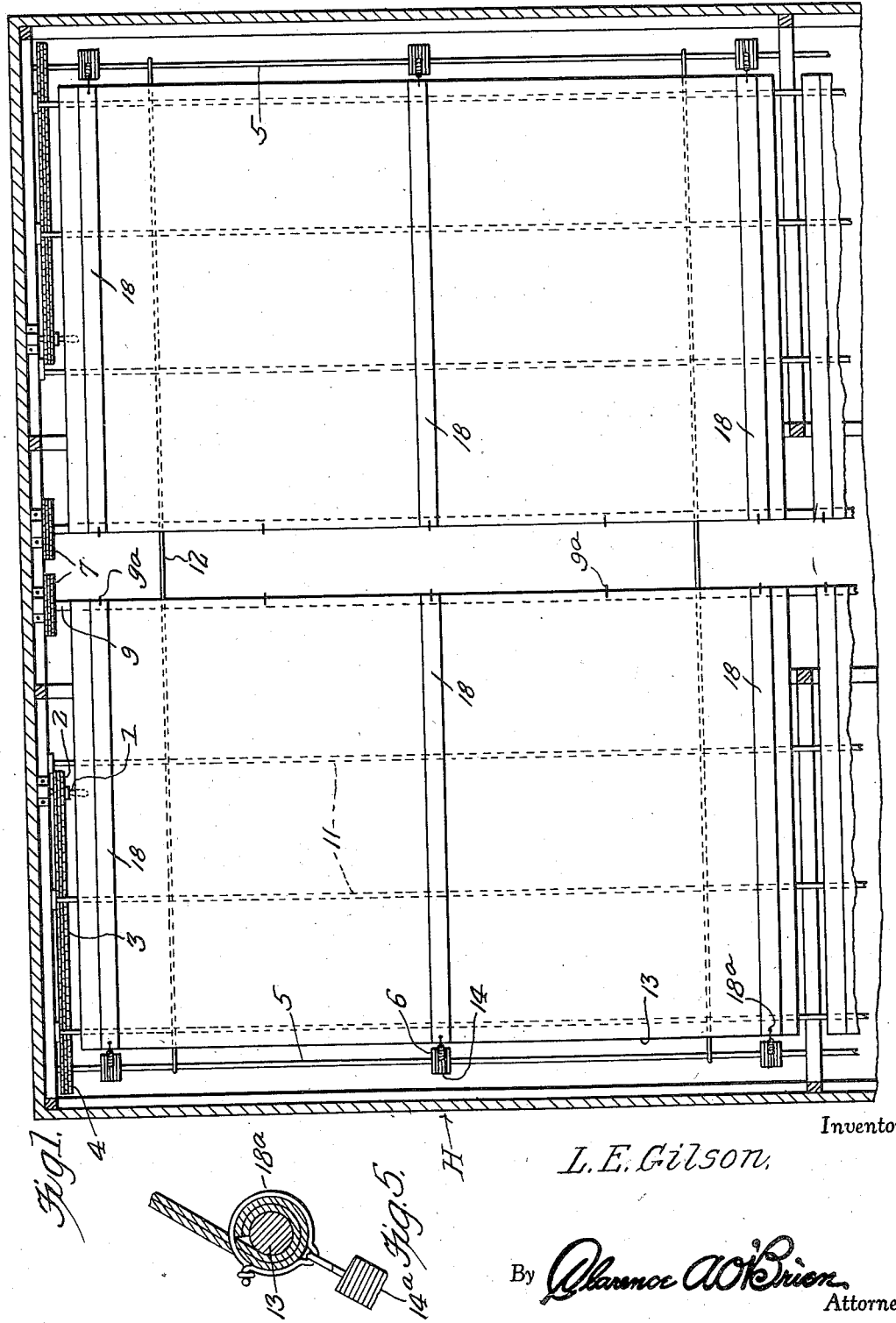
Inventor
L. E. Gilson,
By Clarence A. O'Brien
Attorney

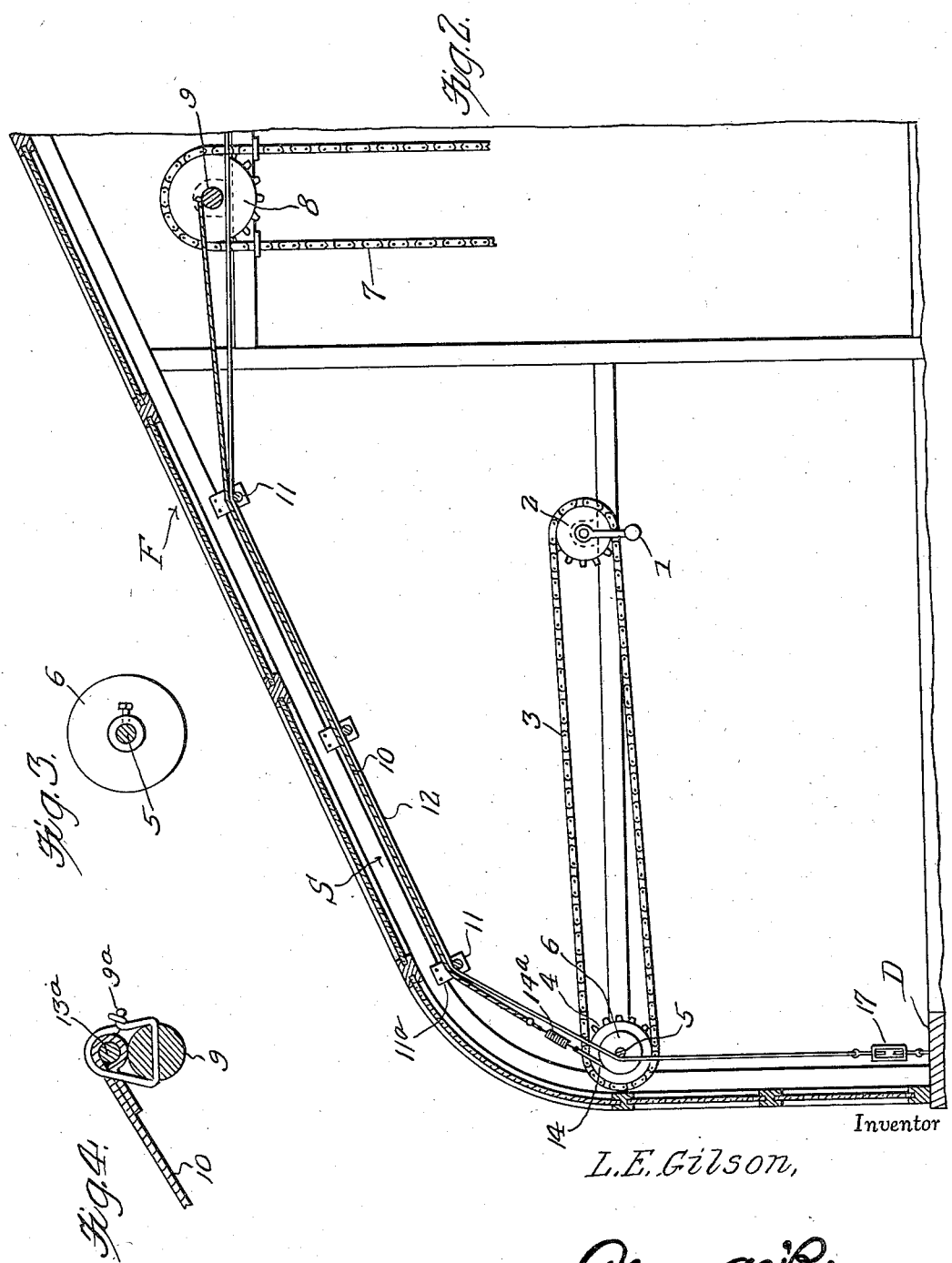

Patented Feb. 18, 1936

2,031,157

UNITED STATES PATENT OFFICE 2,031,157

SHADE FOR GREENHOUSES

Lucian E. Gilson, Marshfield, Wis.

Application March 4, 1935, Serial No. 9,305

3 Claims. (Cl. 156—10)

This invention relates to a shade for greenhouses and consists in the provision of a shade, preferably of cloth and a device for raising and lowering the shade.

Among the objects of the invention is the provision of a shade of any desired length that can be used on the inside or underside of a greenhouse roof, and a device for the lowering and raising of the shade in a convenient and efficient manner.

The invention together with its objects and advantages will be best understood from a study of the following description taken in connection with the accompanying drawings wherein:

Figure 1 is a fragmentary sectional view through a greenhouse and looking downwardly on the shade embodying the features of the present invention.

Figure 2 is a fragmentary vertical sectional view through the greenhouse and a shade.

Figure 3 is a transverse sectional view through a shaft and showing the manner of securing a drum thereto.

Figure 4 is a fragmentary detail sectional view showing the manner of securing one end of the shade to a roller provided therefore.

Figure 5 is a fragmentary detail view showing the manner of connecting an end portion of the shade with a cable windable on a drum as hereinafter more fully referred to.

Referring to the drawings by reference numerals it will be seen that H indicates generally a greenhouse while S indicates a portion of the roof of the greenhouse in accordance with the present invention any number of shades S constructed in accordance with the present invention may be used and arranged in spaced longitudinal alignment lengthwise of the greenhouse at opposite sides of the center thereof.

Each shade S comprises a sheet 10 of suitable fabric or other material trained over and supported by suitably spaced rods 11 extending longitudinally of the greenhouse and in slightly spaced relation to the roof F thereof as shown in Figure 2. The supports 11 are spaced a distance apart as will keep the shades from sagging and are supported at their ends in any suitable manner, as for example by brackets 11a attached to the frame of the roof as also shown in Figure 2. Supporting wires 12 extend between the shade 10 and the bars 11 and at the ends are anchored through the medium of turn buckles 17 to the sills D of the greenhouse. In this connection it is to be noted that the wires 12 extend from one side to the other of the greenhouse over the supporting rods 11 and similar anchoring means are provided for each end of the wires 12, namely turn buckles 17 whereby these wires 12 may be maintained taut.

At its lower edge the shade 10 is provided with a hem in which is secured a suitable rod 13.

Secured to the top face of the shade 10 at spaced intervals are strips 18, of the same material as the shade, the strips 18 being secured to the shade by stitching or any other suitable manner.

Suitably mounted and located as shown in the greenhouse H is a shaft 5 on which is secured in spaced relation sheaves or drums 6. Windable on these drums 6 are flexible cables 14 the free ends of which are connected to springs 14a. Springs 14a, in turn, are connected with the rod equipped end 13 of the shade 10 through the medium of suitable wire rings 18a or in any other suitable manner, and as suggested in Figure 5.

The shade 10 at its upper end or edge is also provided with a rod 13a, and at that end the shade is secured to a shaft 9 through the medium of wire loops 9a, portions of which pass through transverse openings in the shaft 9 as clearly suggested in Figure 4. Shaft 9 is suitably mounted within the greenhouse slightly to one side of the longitudinal center of the greenhouse and suitably spaced downwardly from the apex of the roof.

Preferably the shade 10 is made out of any heavy cloth, such as awning or tent cloth or canvas and may be of any desired color. Also the shade is of such a length as to reach from the shaft 9 to the shaft 5 directly beneath the sloping roof section and may be, as shown in the present instance of such a width as to cover only a portion of the length of the roof. When of such a width a number of shades in alignment may be resorted to at each side of the house, the members 11, 5 and 12 being of such a length as to extend for the full length of the greenhouse so as to support any number of shades 10.

For lowering the shade there is secured to the shaft 5 a sprocket 4 over which is trained a chain 3, that is in turn trained over a sprocket wheel 2 provided on a suitable crank shaft 1 mounted in any suitable manner within the greenhouse and easily accessible. Obviously, by turning the crank 1 shaft 5 will be rotated for winding the flexible elements 14 on the spools 6 resulting in the shade 10 unwinding from the shaft 9 to be extended over the supports 11 in spaced relation to the roof F. When so lowered or extended, a dead air space and partial vacuum is formed between the roof and the shade and serves to keep out the excessive heat in the summer and to prevent moisture and heat from escaping from the inside.

To raise the shades, that is to wind the shades 10 on the shaft 9 there is suitably mounted on the shaft a sprocket 8 around which is disposed a pendent endless chain 7. Obviously by pulling on one run of the chain 7 to rotate the shaft 9 in a clockwise direction the curtain or shades will be caused to wind upon the shaft 9. In the drawings the curtains are shown in their lowered or extended operative position.

It is thought that a clear understanding of the invention together with an appreciation of its advantages and utility will be had from the foregoing description. It is to be understood that changes may be made in the construction, combination and arrangement of the several parts, provided that such changes fall within the scope of the appended claims.

Having thus described the invention, what is claimed as new is:

1. A roof shade for greenhouses comprising a rotatably mounted shaft, a plurality of shade sections windable on said shaft, a second shaft rotatably mounted laterally of and in a lower plane than the first shaft, sheaves on the second shaft, flexible elements windable on said sheaves, each shade section having secured to one face thereof laterally spaced strips, and resilient means connecting said flexible elements with the shade sections in line with said strips, and means for rotating said shafts to wind and unwind said shade sections.

2. In a shade of the class described, a pair of laterally spaced rotatably mounted shafts, a shade windable on one of said shafts, laterally spaced reinforcing strips secured to the shade at one side thereof, and means connecting the free end of the shade with the other said shaft, said means being arranged in alinement with the said strips.

3. In a shade of the class described, a pair of laterally spaced rotatably mounted shafts, a shade windable on one of said shafts, laterally spaced reinforcing strips secured to the shade at one side thereof, and means connecting the free end of the shade with the other said shaft, said means being arranged in alinement with the said strips, said means including flexible elements windable on the last named shaft, and resilient means connecting said flexible elements with the shade.

LUCIAN E. GILSON.